(12) United States Patent
Mitani et al.

(10) Patent No.: US 9,180,814 B2
(45) Date of Patent: Nov. 10, 2015

(54) VEHICLE REAR LEFT AND RIGHT SIDE WARNING APPARATUS, VEHICLE REAR LEFT AND RIGHT SIDE WARNING METHOD, AND THREE-DIMENSIONAL OBJECT DETECTING DEVICE

(71) Applicant: ALPINE ELECTRONICS, INC., Tokyo (JP)

(72) Inventors: Kosuke Mitani, Iwaki (JP); Takaki Okino, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/278,024

(22) Filed: May 15, 2014

(65) Prior Publication Data

US 2015/0029012 A1    Jan. 29, 2015

(30) Foreign Application Priority Data

Jul. 26, 2013    (JP) ................. 2013-155197

(51) Int. Cl.
*B60Q 1/00* (2006.01)
*G08G 1/017* (2006.01)
*B60D 1/28* (2006.01)
*G06F 17/10* (2006.01)
*H04N 7/18* (2006.01)
*G06K 9/00* (2006.01)
*B60Q 9/00* (2006.01)
*B60R 1/00* (2006.01)
*G08G 1/16* (2006.01)

(52) U.S. Cl.
CPC . *B60Q 9/008* (2013.01); *B60R 1/00* (2013.01); *G06K 9/00805* (2013.01); *G08G 1/165* (2013.01); *G08G 1/166* (2013.01); *G08G 1/167* (2013.01); *B60R 2300/105* (2013.01); *B60R 2300/30* (2013.01); *B60R 2300/804* (2013.01); *B60R 2300/8033* (2013.01); *B60R 2300/8093* (2013.01)

(58) Field of Classification Search
CPC ......................................................... B60Q 1/00
See application file for complete search history.

(56) References Cited

U.S. PATENT DOCUMENTS

| 8,027,029 | B2* | 9/2011 | Lu et al. ................. 356/4.01 |
| 2007/0069873 | A1* | 3/2007 | Kudo ..................... 340/435 |
| 2009/0248270 | A1* | 10/2009 | Sekiguchi ................. 701/96 |
| 2010/0201509 | A1 | 8/2010 | Hara et al. |
| 2011/0123961 | A1* | 5/2011 | Staplin ............. G09B 19/167 434/64 |

(Continued)

FOREIGN PATENT DOCUMENTS

| JP | 2008-034981 | 2/2008 |
| JP | 2010-181928 | 8/2010 |

*Primary Examiner* — Jennifer Mehmood
*Assistant Examiner* — Pameshanand Mahase
(74) *Attorney, Agent, or Firm* — Brinks Gilson & Lione (57) ABSTRACT

A 3D object detecting device includes a driving-lane detecting unit that detects a driving lane of a vehicle; a 3D-object detecting unit that detects, by using pattern recognition technology, a type of 3D object with respect to images captured by side cameras; and a recognition-priority setting unit that varies and sets a recognition priority for the detected type of 3D object, based on the detected driving lane. In accordance with the driving lane of the vehicle, the recognition-priority setting unit sets the priority for pattern recognition lower for a type of 3D object that is less likely to exist in rear left and right sides of the vehicle, to thereby reduce the possibility that a 3D object that should not be regarded as a warning target is erroneously detected from the images as a warning subject.

21 Claims, 7 Drawing Sheets

(56) References Cited

U.S. PATENT DOCUMENTS

| | | | |
|---|---|---|---|
| 2012/0026332 A1* | 2/2012 | Hammarstrom et al. | 348/148 |
| 2013/0286193 A1* | 10/2013 | Pflug | 348/135 |
| 2014/0136414 A1* | 5/2014 | Abhyanker | 705/44 |
| 2014/0376769 A1* | 12/2014 | Bulan et al. | 382/103 |

* cited by examiner

| | DRIVING PATTERN | LEFT SIDE CAMERA | | | RIGHT SIDE CAMERA | | |
|---|---|---|---|---|---|---|---|
| | | 4 WHEEL | 2 WHEEL | PEDESTRIAN | 4 WHEEL | 2 WHEEL | PEDESTRIAN |
| (1) | WHEN TRAVELING IN LEFTMOST LANE | LOW | HIGH | LOW | HIGH | HIGH | LOW |
| (2) | WHEN TRAVELING IN CENTER LANE OF THREE OR MORE LANES | HIGH | HIGH | LOW | HIGH | HIGH | LOW |
| (3) | WHEN TRAVELING IN RIGHTMOST LANE | HIGH | HIGH | LOW | LOW | HIGH | LOW |
| (4) | WHEN TRAVELING ON ROAD WITH ONE LANE ON EACH SIDE | LOW | HIGH | LOW | LOW | HIGH | LOW |

| | DRIVING PATTERN | LEFT SIDE CAMERA | | | RIGHT SIDE CAMERA | | |
|---|---|---|---|---|---|---|---|
| | | 4 WHEEL | 2 WHEEL | PEDESTRIAN | 4 WHEEL | 2 WHEEL | PEDESTRIAN |
| (1) | WHEN TRAVELING AT LOW SPEED IN LEFTMOST LANE | LOW | HIGH | HIGH | HIGH | HIGH | HIGH |
| | WHEN TRAVELING AT HIGH SPEED IN LEFTMOST LANE | LOW | HIGH | LOW | HIGH | HIGH | LOW |
| (2) | WHEN TRAVELING AT LOW SPEED IN CENTER LANE OF 3 OR MORE LANES | HIGH | HIGH | MEDIUM | HIGH | HIGH | MEDIUM |
| | WHEN TRAVELING AT HIGH SPEED IN CENTER LANE OF 3 OR MORE LANES | HIGH | HIGH | LOW | HIGH | HIGH | LOW |
| (3) | WHEN TRAVELING AT LOW SPEED IN RIGHTMOST LANE | HIGH | HIGH | MEDIUM | LOW | HIGH | MEDIUM |
| | WHEN TRAVELING AT HIGH SPEED IN RIGHTMOST LANE | HIGH | HIGH | LOW | LOW | HIGH | LOW |
| (4) | WHEN TRAVELING AT LOW SPEED ON ROAD WITH ONE LANE ON EACH SIDE | LOW | HIGH | HIGH | LOW | HIGH | HIGH |
| | WHEN TRAVELING AT HIGH SPEED ON ROAD WITH ONE LANE ON EACH SIDE | LOW | HIGH | LOW | LOW | HIGH | LOW |

VEHICLE REAR LEFT AND RIGHT SIDE WARNING APPARATUS, VEHICLE REAR LEFT AND RIGHT SIDE WARNING METHOD, AND THREE-DIMENSIONAL OBJECT DETECTING DEVICE

RELATED APPLICATION

The present application claims priority to Japanese Patent Application Number 2013-155197, filed Jul. 26, 2013, the entirety of which is hereby incorporated by reference.

BACKGROUND

1. Field of the Invention

The present invention relates to a vehicle rear left and right side warning apparatus, a vehicle rear left and right side warning method, and a three-dimensional (3D) object detecting device. In particular, the present invention relates to an apparatus, a method, and a device which photograph rear left and right sides of a vehicle by using cameras and which issue a warning upon detecting a 3D object, such as another vehicle or a pedestrian, and also to a 3D-object detecting device for use in the apparatus and the method.

2. Description of the Related Art

Recent years have seen active development of systems for enhancing safe driving of vehicles. As one of the developed technologies, there is a system in which a 3D object (such as another vehicle or pedestrian) that is present in the vicinity of a vehicle in question is detected and is reported to the driver. For example, with respect to images at the rear left and right sides of a vehicle in question which are captured by side cameras, one known system detects a 3D object having a predetermined shape by using pattern recognition technology and issues a warning when the detected 3D object comes within a predetermined distance of the vehicle, and another known system issues a warning when another vehicle traveling parallel to a vehicle in question is detected outside the range of the driver's view.

Figure 7:
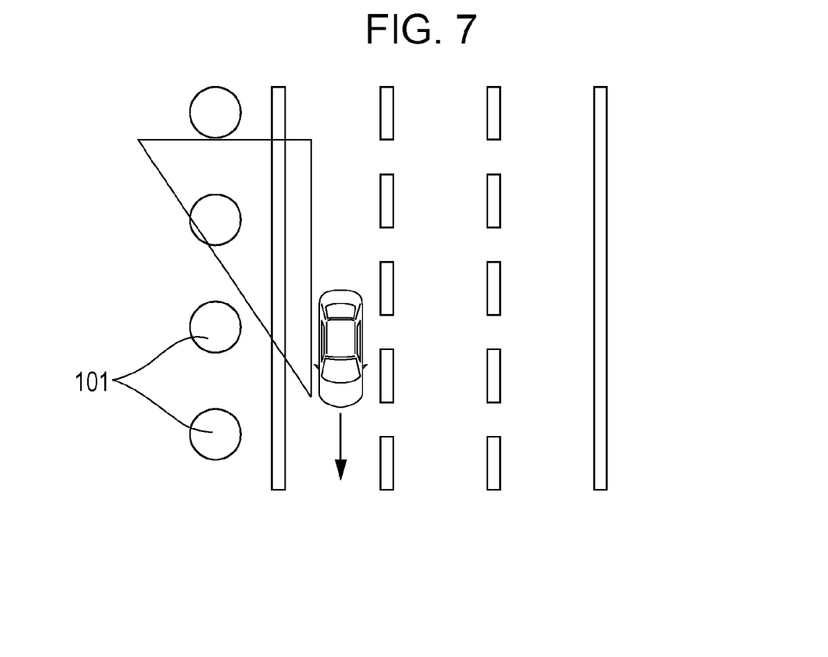
FIG. 7 is a schematic view illustrating a problem in the related art.
Figure 8:
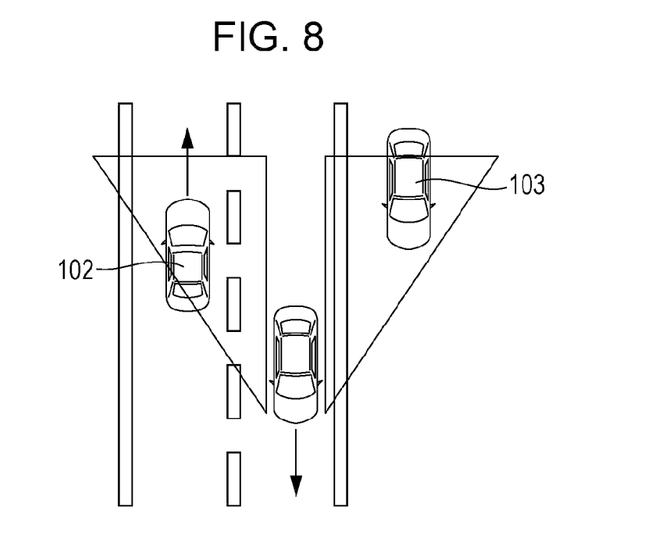
FIG. 8 is a schematic view illustrating a problem in the related art.

However, when a 3D object in the vicinity of the vehicle is detected with simple pattern recognition, there are cases in which an object other than other vehicles and pedestrians to be regarded as warning targets is detected and a false warning is issued. For example, since planted trees 101 in a median have elongated shapes, as illustrated in FIG. 7, in some cases they are recognized as two-wheeled vehicles or people, thus causing a false warning to be issued. There are also cases in which, as illustrated in FIG. 8, another vehicle 102 traveling in an opposite lane or a vehicle 103 parked in a lane in the same direction as that of a vehicle in question is recognized as a vehicle traveling in a lane in the same direction, thus causing a false warning to be issued.

Some systems aimed at increasing the accuracy of warnings have been proposed (e.g., see Japanese Unexamined Patent Application Publication No. 2008-34981 and Japanese Unexamined Patent Application Publication No. 2010-181928). The system disclosed in Japanese Unexamined Patent Application Publication No. 2008-34981 is intended to improve the accuracy of recognizing objects in images. The system is adapted to accurately identify a candidate area in which an object (a pedestrian) that is a determination target is highly likely to be present, by identifying, in an input image, an area other than road-surface-marking areas as a candidate area for pedestrian recognition.

In the system disclosed in Japanese Unexamined Patent Application Publication No. 2010-181928, the position of a sidewalk boundary is detected in addition to a moving object (a pedestrian) that is present in the vicinity of a vehicle. The system is further adapted to evaluate a degree of risk of collision of the vehicle with the moving object, considering its surrounding situation on the basis of position information of the moving object and the position of the sidewalk boundary, and to issue a warning on the basis of the degree of risk.

However, the systems disclosed in Japanese Unexamined Patent Application Publication No. 2008-34981 and Japanese Unexamined Patent Application Publication No. 2010-181928 are both technologies for increasing the accuracy of recognizing pedestrians to reduce false warnings. Hence, these systems do not overcome the problem that another vehicle traveling in an opposite lane or a vehicle parked in a lane in the same direction as that of a vehicle in question, as illustrated in FIG. 8, is recognized as a vehicle traveling in a lane in the same direction, thus causing a false warning to be issued. The systems disclosed in Japanese Unexamined Patent Application Publication No. 2008-34981 and Japanese Unexamined Patent Application Publication No. 2010-181928 are both intended to increase the recognition accuracy by identifying an area in which a pedestrian is highly likely to be present. However, even when such an area is identified, the problem still exists that, when an elongated 3D object exists in that area, as illustrated in FIG. 7, the object is recognized as a two-wheeled vehicle or a pedestrian, causing a false warning to be issued.

SUMMARY

The present invention has been made in order to overcome such a problem, and an object of embodiments of the present invention is to make it possible to further reduce false warnings that are issued as a result of detecting a 3D object other than other vehicles and pedestrians to be regarded as warning targets.

In order to overcome the problems described above, according to embodiments of the present invention, with respect to images captured by cameras that photograph the rear left and right sides of a host vehicle, a 3D object that is present at the rear left and right sides of the host vehicle is detected by using a pattern recognition technology. When the relative positional relationship between the host vehicle and the detected 3D object satisfies a predetermined condition, a warning is issued. In addition, on the basis of the driving lane of the host vehicle, the recognition priority for the type of 3D object detected using the pattern recognition technology is varied and set.

According to embodiments of the present invention configured as described above, with respect to the type of 3D object that is less likely to be present to the rear left and right of the vehicle, the priority for the pattern recognition can be set low in accordance with the driving lane of the vehicle. Thus, it is possible to reduce the possibility that, with respect to the type of 3D object for which the recognition priority is set to "low", a 3D object that should not be regarded as a warning target (e.g., an elongated 3D object that is neither a pedestrian nor a two-wheeled vehicle, another vehicle traveling in the opposite lane, or a vehicle parked in a lane in the same direction as that of the vehicle in question) is erroneously detected from the images as a warning subject. This makes it possible to further reduce false warnings that are issued as a result of detecting a 3D object other than other vehicles or pedestrians to be regarded as warning targets.

DESCRIPTION OF THE PREFERRED EMBODIMENTS (First Embodiment)

Figure 1:
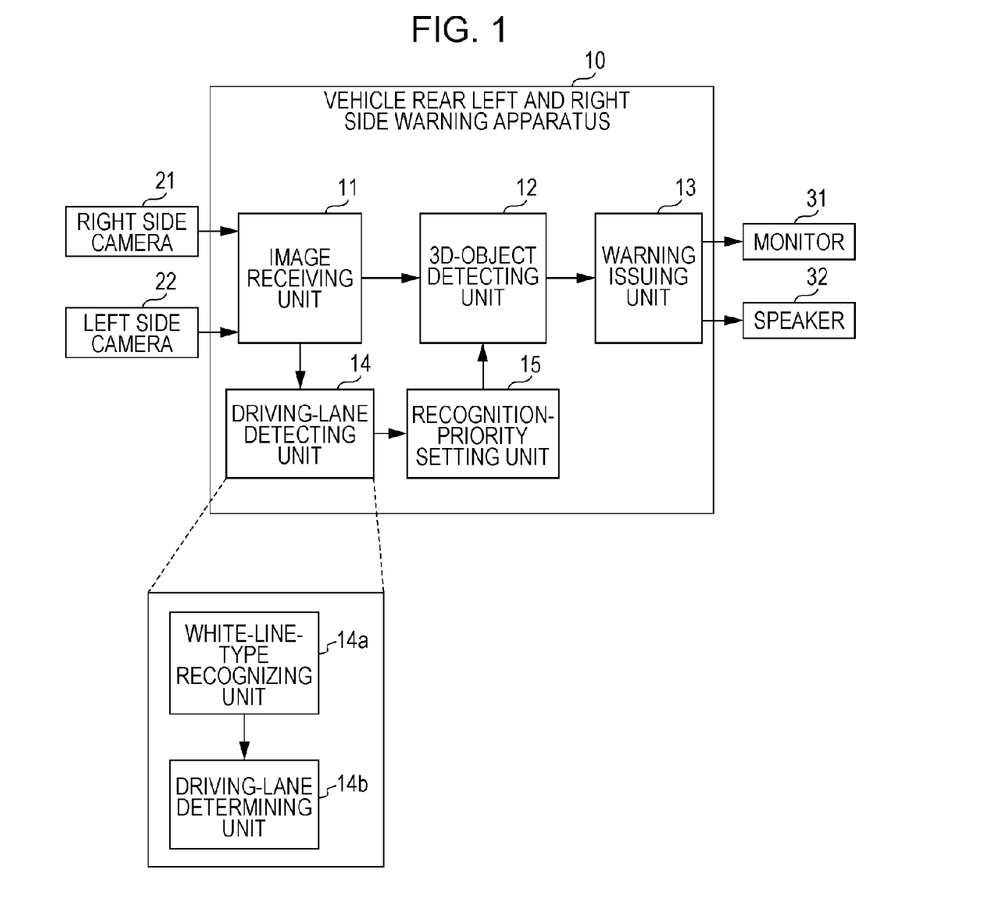
FIG. 1 is a block diagram illustrating an example functional configuration of a vehicle rear left and right side warning apparatus according to a first embodiment.

A first embodiment of the present invention will be described with reference to the accompanying drawings. FIG. 1 is a block diagram illustrating an example functional configuration of a vehicle rear left and right side warning apparatus according to the first embodiment. With respect to an image at the rear left and right sides of a vehicle captured by left and right side cameras 21 and 22 mounted thereon (the vehicle is hereinafter referred to as a "host vehicle"), a vehicle rear left and right side warning apparatus 10 according to the first embodiment detects a 3D object, such as another vehicle or pedestrian, by using a pattern recognition technology, and issues a warning when the detected 3D object comes within a predetermined distance of the host vehicle.

As illustrated in FIG. 1, the vehicle rear left and right side warning apparatus 10 according to the first embodiment has a functional configuration including an image receiving unit 11, a three-dimensional (3D) object detecting unit 12, a warning issuing unit 13, a driving-lane detecting unit 14, and a recognition-priority setting unit 15. The image receiving unit 11, the 3D-object detecting unit 12, the driving-lane detecting unit 14, and the recognition-priority setting unit 15 constitute a 3D-object detecting device.

Functions of these elements 11 to 15 can be implemented by any of hardware, a digital signal processor (DSP), and software. For example, when implemented by software, the functions of the elements 11 to 15 are in practice implemented with a central processing unit (CPU), a random access memory (RAM), a read only memory (ROM), and so on in a computer and are realized by operation of a program stored in a recording medium, such as the RAM, the ROM, a hard disk, or a semiconductor memory.

The image receiving unit 11 receives a captured image from the right side camera 21 that photographs a rear right-side area of the host vehicle and a captured image from the left side camera 22 that photographs a rear left-side area of the host vehicle.

On the basis of the images captured by the side cameras 21 and 22 and received by the image receiving unit 11, the 3D-object detecting unit 12 detects a 3D object that exists at the rear left and right sides of the host vehicle by using a pattern recognition technology. That is, the 3D-object detecting unit 12 stores therein multiple types of pattern shape for 3D objects (e.g., a four-wheeled vehicle, a two-wheeled vehicle, and a pedestrian) to be regarded as warning targets. The 3D-object detecting unit 12 determines whether or not a subject having a shape whose degree of match with any of the pattern shapes is higher than or equal to a threshold exists in the images captured by the side cameras 21 and 22. Then, when a subject having a shape whose degree of match is larger than or equal to the threshold exists, the 3D-object detecting unit 12 detects the subject as a 3D object to be regarded as a warning target.

When a relative positional relationship between the host vehicle and the 3D object detected by the 3D-object detecting unit 12 satisfies a predetermined condition, the warning issuing unit 13 issues a predetermined warning. The predetermined condition may be that the 3D object detected by the 3D-object detecting unit 12 comes within a predetermined distance of the host vehicle. The distance between the host vehicle and the 3D object can be determined based on the position where the 3D object is detected in the captured images. Since a known technology can be used as a method for the distance calculation in this case, a detailed description thereof is not given hereinafter.

The predetermined warning may be a message displayed on a monitor 31, a warning sound output from a speaker 32, or a combination thereof. The warning issuing unit 13 may be adapted to change the mode of the warning in accordance with the type of 3D object (any of a four-wheeled vehicle, a two-wheeled vehicle, and a pedestrian) detected by the 3D-object detecting unit 12. That is, the warning issuing unit 13 may change the content of the displayed message and may also change the type of warning sound in accordance with the type of 3D object.

The driving-lane detecting unit 14 detects a driving lane of the host vehicle. More specifically, the driving-lane detecting unit 14 has a white-line-type recognizing unit 14a and a driving-lane determining unit 14b. By analyzing the types of white lines captured in the captured images, the driving-lane detecting unit 14 detects a lane in which the host vehicle is traveling. On the basis of images including a road surface photographed by the side cameras 21 and 22, the white-line-type recognizing unit 14a recognizes the types of white lines (a solid line or a dashed line) that delimit the driving lane of the host vehicle. On the basis of the types of the white lines that exist to the left and right of the host vehicle, the types being recognized by the driving-lane determining unit 14b, the white-line-type recognizing unit 14a determines the driving lane of the host vehicle.

Figure 2:
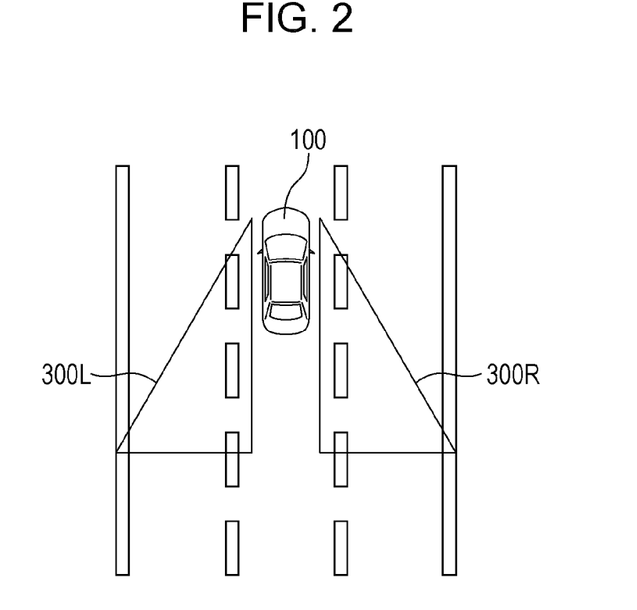
FIG. 2 illustrates details of processing performed by a driving-lane detecting unit.

FIG. 2 illustrates details of processing performed by the driving-lane detecting unit 14. In this case, for ease of description, it is assumed that a host vehicle 100 is traveling on a road with three lanes on each side of the road. As illustrated in FIG. 2, the right side camera 21 is placed at the right side of the host vehicle 100 to photograph a rear right-side area 300R. The left side camera 22 is placed at the left side of the host vehicle 100 to photograph a rear left-side area 300L.

In this case, when dashed white lines are captured in both of the captured image of the rear right-side area 300R and the captured image of the rear left-side area 300L, as illustrated in FIG. 2, the driving-lane detecting unit 14 determines that the host vehicle 100 is traveling in a center lane. This is also true for a case in which the host vehicle 100 is traveling on a road with four or more lanes on each side of the road.

When a dashed white line is captured in the captured image of the rear right-side area 300R and a solid white line is captured in the captured image of the rear left-side area 300L, the driving-lane detecting unit 14 determines that the host vehicle 100 is traveling in the left-end lane. This is also true for a case in which the host vehicle 100 is traveling on a road with two lanes on each side of the road or with four or more lanes on each side of the road.

In addition, when a solid white line is captured in the captured image of the rear right-side area 300R and a dashed white line is captured in the captured image of the rear left-side area 300L, the driving-lane detecting unit 14 determines that the host vehicle 100 is traveling in the right-end lane. This is also true for a case in which the host vehicle 100 is traveling on a road with two lanes on each side of the road or with four or more lanes on each side of the road.

Also, when a solid white line is captured in the captured image of the rear right-side area 300R and a solid white line is captured in the captured image of the rear left-side area 300L, the driving-lane detecting unit 14 determines that the host vehicle 100 is traveling on a road with one lane on each side of the road.

The method for the driving-lane determination made by the driving-lane detecting unit 14 is not limited to the method described above. For example, a lane in which the host vehicle is traveling may also be determined based on map data having lane information and positioning data obtained by a global positioning system (GPS) receiver having an accuracy at which a positioning error is smaller than the lane width. In such a case, it is preferable to further detect the number of lanes on the road on which the host vehicle is traveling. For example, the number of lanes on the road on which the host vehicle is traveling is detected based on the map data.

On the basis of the driving lane detected by the driving-lane detecting unit 14, the recognition-priority setting unit 15 varies and sets a recognition priority for the type of 3D object that the 3D-object detecting unit 12 detects by using a pattern recognition technology. In particular, on the basis of the driving lane detected by the driving-lane detecting unit 14, the recognition-priority setting unit 15 varies and sets the recognition priority for the type of 3D object in each of the rear right side image and the rear left side image captured by the side cameras 21 and 22.

Figure 3:
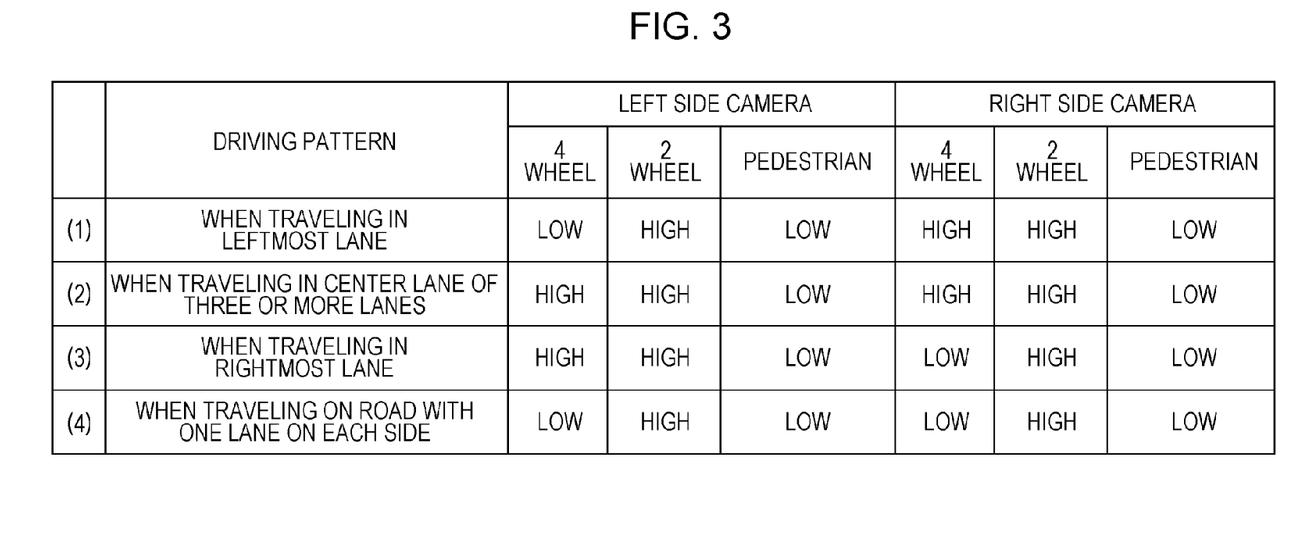
FIG. 3 is a table illustrating a recognition priority for a corresponding type of 3D object, the recognition priority being varied and set by a recognition-priority setting unit according to the first embodiment.

FIG. 3 is a table illustrating the recognition priority for the corresponding type of 3D object, the recognition priority being varied and set by the recognition-priority setting unit 15. As illustrated in FIG. 3, the type of 3D object used for the recognition priority includes a pedestrian, a four-wheeled vehicle, and a two-wheeled vehicle in this example. When the driving-lane detecting unit 14 detects that the host vehicle is traveling in the leftmost lane of a road with multiple lanes on each side, the recognition-priority setting unit 15 sets the recognition priority for the pedestrian lower than the recognition priorities for the four-wheeled vehicle and the two-wheeled vehicle, with respect to a rear right side image captured by the right side camera 21. This is because the possibility that a pedestrian is present to the right of the host vehicle is considerably low when the host vehicle is traveling in the leftmost lane. The recognition-priority setting unit 15 also sets the recognition priorities for the four-wheeled vehicle and the pedestrian lower than the recognition priority for the two-wheeled vehicle, with respect to a rear left side image captured by the left side camera 22. This is because, when the host vehicle is traveling in the leftmost lane, the possibility that a four-wheeled vehicle is traveling at the left side of the host vehicle is considerably low, and it is also unlikely that any pedestrian is approaching the host vehicle.

When the driving-lane detecting unit 14 detects that the host vehicle is traveling in a lane other than the leftmost or rightmost lane on a road with multiple lanes on each side (e.g., in the center lane on a road with three lanes on each side of the road), the recognition-priority setting unit 15 sets the recognition priority for the pedestrian lower than the recognition priorities for the four-wheeled vehicle and the two-wheeled vehicle, with respect to both of a rear right side image and a rear left side image captured by the side cameras 21 and 22. This is because, when the host vehicle is traveling in the center lane, the possibility that a pedestrian is present to the left and right of the host vehicle is considerably low.

When the driving-lane detecting unit 14 detects that the host vehicle is traveling in the rightmost lane on a road with multiple lanes on each side of the road, the recognition-priority setting unit 15 sets the recognition priority for the four-wheeled vehicle and the pedestrian lower than the recognition priority for the two-wheeled vehicle, with respect to a rear right side image captured by the right side camera 21. This because, when the host vehicle is traveling in the rightmost lane, the possibility that a pedestrian and a four-wheeled vehicle that is traveling in the same direction as the host vehicle are present to the right of the host vehicle is considerably low. The recognition-priority setting unit 15 also sets the recognition priority for the pedestrian lower than the recognition priorities for the four-wheeled vehicle and the two-wheeled vehicle, with respect to a rear left side image captured by the left side camera 22. This is because, when the host vehicle is traveling in the rightmost lane, the possibility that a pedestrian is present to the left of the host vehicle is considerably low.

In addition, when the driving-lane detecting unit 14 detects that the host vehicle is traveling on a road with one lane on each side, the recognition-priority setting unit 15 sets the recognition priorities for the four-wheeled vehicle and the pedestrian lower than the recognition priority for the two-wheeled vehicle, with respect to a rear right side image captured by the right side camera 21. This is because, when the host vehicle is traveling on a road with one lane on each side of the road, the possibility that a pedestrian and a four-wheeled vehicle traveling in the same direction as the host vehicle are present to the right of the host vehicle is considerably low. The recognition-priority setting unit 15 also sets the recognition priorities for the four-wheeled vehicle and the pedestrian lower than the recognition priority for the two-wheeled vehicle, with respect to a rear left side image captured by the left side camera 22. This is because, when the host vehicle is traveling on a road with one lane on each side, the possibility that a four-wheeled vehicle is traveling at the left side of the host vehicle and in the same direction as the host vehicle is considerably low, and it is also unlikely that any pedestrian is approaching the host vehicle.

For setting the recognition priority low, the recognition-priority setting unit 15 sets the threshold for recognizing that a subject in question is a 3D object to be regarded as a warning target to a larger value than the ordinary value, with respect to a degree of match between the shape of a subject that is found in images captured by the side cameras 21 and 22 and the pattern shape for a 3D object to be regarded as a warning target. That is, a condition for recognizing that the shape of a subject is the same as the pattern shape is tightened to thereby prevent a similar shape from being falsely recognized as a 3D object to be regarded as a warning target.

Figure 4:
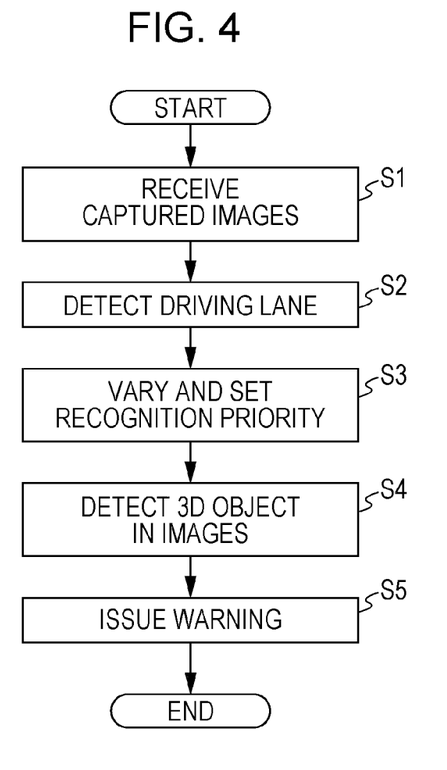
FIG. 4 is a flowchart illustrating an example operation of the vehicle rear left and right side warning apparatus according to the first embodiment.

FIG. 4 is a flowchart illustrating an example operation of the vehicle rear left and right side warning apparatus 10 according to the first embodiment configured as described above. The flowchart illustrated in FIG. 4 is started when the power supply of a vehicle-mounted system having the vehicle rear left and right side warning apparatus 10 is turned on.

First, in step S1, the image receiving unit 11 receives captured images respectively from the right side camera 21 and the left side camera 22. In step S2, the driving-lane detecting unit 14 detects the driving lane of the host vehicle by analyzing the captured images received by the image receiving unit 11. In step S3, on the basis of the driving lane detected by the driving-lane detecting unit 14, the recognition-priority setting unit 15 varies and sets the recognition priority for the type of 3D object detected using a pattern recognition technology, as illustrated in FIG. 3.

Subsequently, in step S4, with respect to the images captured by the side cameras 21 and 22, the 3D-object detecting unit 12 detects a 3D object to be regarded as a warning target that exists at the rear left side or right side of the host vehicle, by using the pattern recognition technology using the recognition priority varied and set by the recognition-priority setting unit 15. The warning issuing unit 13 then determines whether or not the relative positional relationship between the host vehicle and the 3D object detected by the 3D-object detecting unit 12 satisfies a predetermined condition. When the relative positional relationship satisfies the predetermined condition, the warning issuing unit 13 issues a warning in step S5.

As described above in detail, according to the first embodiment, with respect to images of the rear left and right sides of a host vehicle photographed by the side cameras 21 and 22, the vehicle rear left and right side warning apparatus 10 detects a 3D object that is present at the rear left side or right side of the host vehicle by using a pattern recognition technology. When the relative positional relationship between the host vehicle and the detected 3D object satisfies a predetermined condition, the vehicle rear left and right side warning apparatus 10 issues a warning. In addition, on the basis of the driving lane of the host vehicle, the vehicle rear left and right side warning apparatus 10 varies and sets the recognition priority for the type of 3D object detected using the pattern recognition technology.

According to the first embodiment configured as described above, with respect to the type of 3D object that is less likely to be present to the rear left or rear right of the host vehicle, the priority for the pattern recognition can be set low (the condition for recognizing that the shape of a subject is the same as the pattern shape is tightened) in accordance with the driving lane of the host vehicle. Thus, it is possible to reduce the possibility that, with respect to the type of 3D object for which the recognition priority is set to "low", a 3D object that should not be regarded as a warning target (e.g., an elongated 3D object that is neither a pedestrian nor a two-wheeled vehicle, another vehicle traveling in the opposite lane, or a vehicle parked in a lane in the same direction as that of the host vehicle) is erroneously detected from the images as a warning subject. This makes it possible to further reduce false warnings that are issued as a result of detecting a 3D object other than other vehicles or pedestrians to be regarded as warning targets.

(Second Embodiment)

Figure 5:
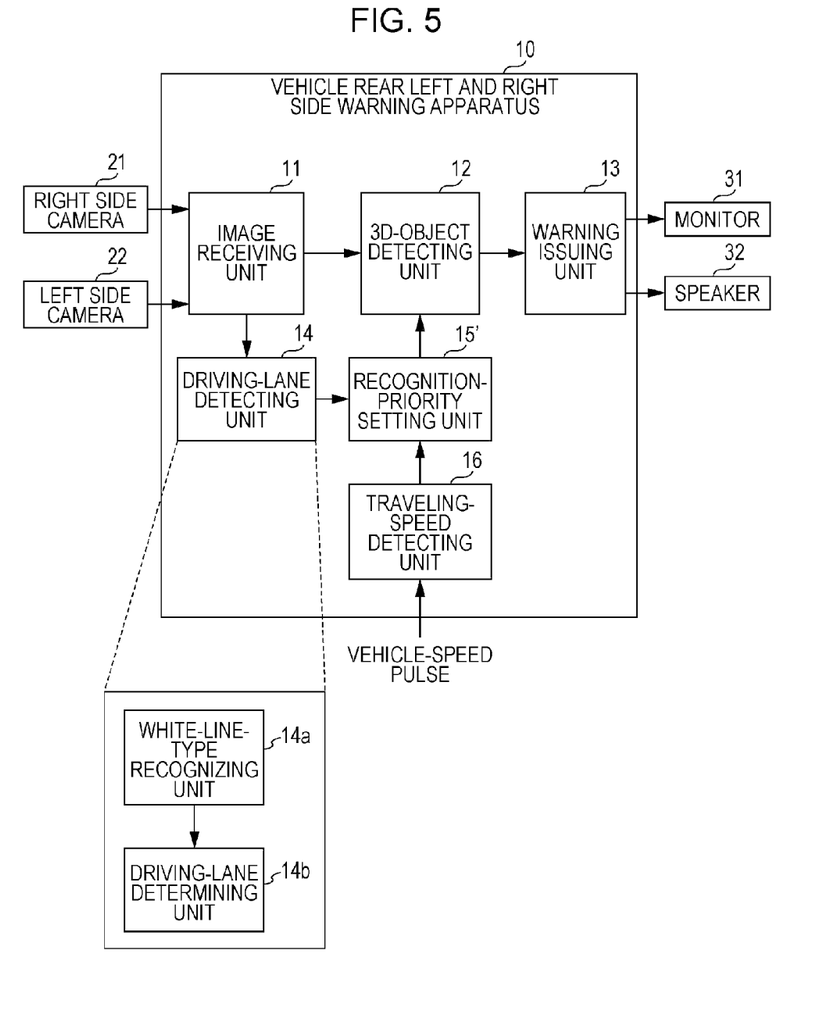
FIG. 5 is a block diagram illustrating an example functional configuration of a vehicle rear left and right side warning apparatus according to a second embodiment.

Next, a description will be given of a second embodiment of the present invention. FIG. 5 is a block diagram illustrating an example functional configuration of a vehicle rear left and right side warning apparatus 10 according to the second embodiment. In FIG. 5, elements that are denoted by the same reference numerals as those illustrated in FIG. 1 have the same or similar functions, and thus redundant descriptions are not given hereinafter.

In the second embodiment, as illustrated in FIG. 5, the vehicle rear left and right side warning apparatus 10 further has a traveling-speed detecting unit 16 in addition to the configuration illustrated in FIG. 1. The vehicle rear left and right side warning apparatus 10 also has a recognition-priority setting unit 15' in place of the recognition-priority setting unit 15. The image receiving unit 11, the 3D-object detecting unit 12, the driving-lane detecting unit 14, the recognition-priority setting unit 15', and the traveling-speed detecting unit 16 constitute a 3D-object detecting device.

The traveling-speed detecting unit 16 detects a traveling speed of the host vehicle on the basis of a vehicle-speed pulse input through an in-vehicle network (not illustrated), such as a vehicular LAN. The traveling-speed detecting unit 16 then determines whether or not the detected traveling speed is lower than a predetermined speed (e.g., 10 km/h).

Figure 6:
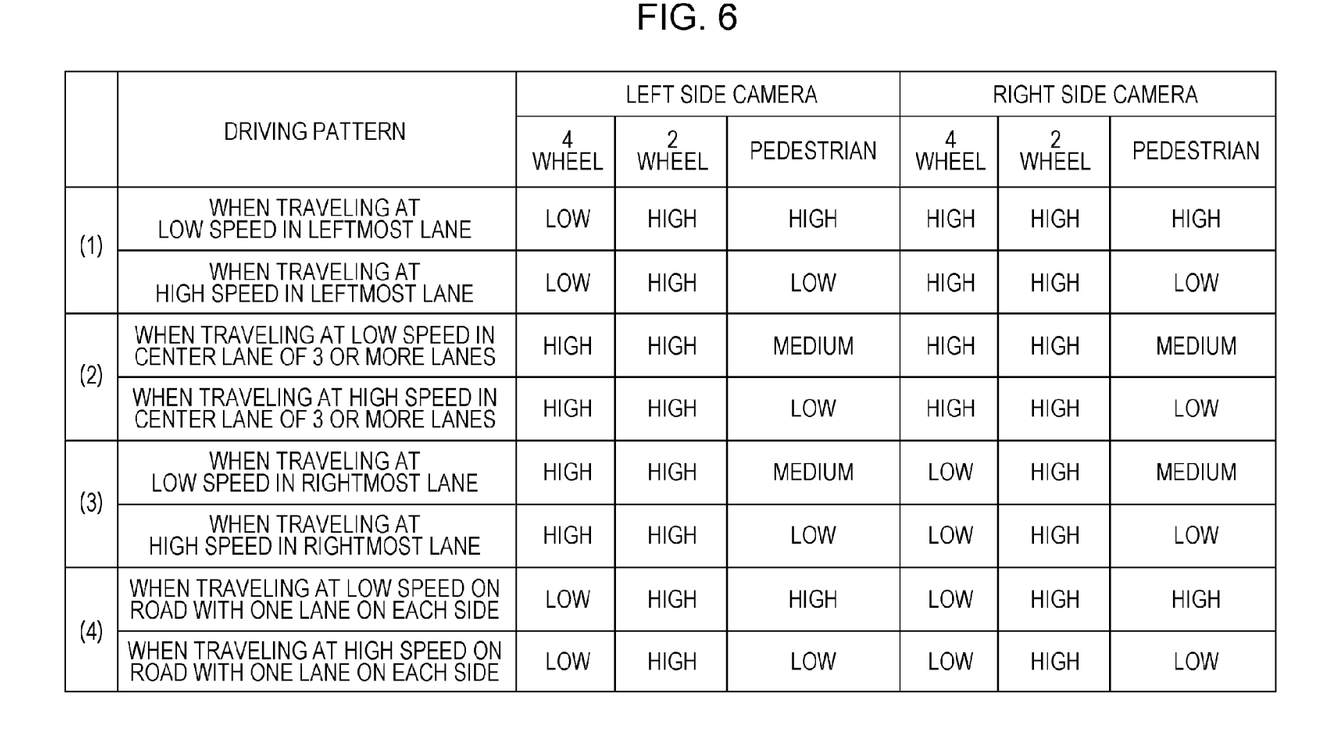
FIG. 6 is a table illustrating a recognition priority for a corresponding type of 3D object, the recognition priority being varied and set by a recognition-priority setting unit according to the second embodiment.

On the basis of the driving lane detected by the driving-lane detecting unit 14 and the traveling speed detected by the traveling-speed detecting unit 16, the recognition-priority setting unit 15' varies and sets a recognition priority for the type of 3D object detected using the pattern recognition technology. FIG. 6 is a table illustrating the recognition priority for a corresponding type of 3D object, the recognition priority being varied and set by the recognition-priority setting unit 15'.

As illustrated in FIG. 6, the recognition-priority setting unit 15' varies the recognition priority between a case in which the traveling speed is lower than the predetermined speed (i.e., traveling at low speed) and a case in which the traveling speed is higher than the predetermined speed (i.e., traveling at medium or high speed). The recognition priorities when the traveling speed is higher than the predetermined speed are the same as those illustrated in FIG. 3. On the other hand, the recognition priorities when the traveling speed is lower than the predetermined speed are the same as those illustrated in FIG. 3 for a four-wheeled vehicle and a two-wheeled vehicle and are different from those illustrated in FIG. 3 for pedestrians. The recognition priority for pedestrians is adapted to be set in three steps: "high", "medium", and "low".

The description below will be given of the recognition priority for pedestrians when the traveling-speed detecting unit 16 detects that the traveling speed of the host vehicle is lower than the predetermined speed. When the driving-lane detecting unit 14 detects that the host vehicle is traveling in the leftmost lane of a road with multiple lanes on each side of the road, the recognition-priority setting unit 15' sets the recognition priority for pedestrians to "high" with respect to both of a rear right side image and a rear left side image captured by the side cameras 21 and 22. This is because, even when the host vehicle is traveling in the leftmost lane, the possibility that a pedestrian approaches the left or right side of the host vehicle on foot is relatively high when the host vehicle is traveling at low speed because of a traffic jam or the like.

Also, when the driving-lane detecting unit 14 detects that the host vehicle is traveling in a lane other than the leftmost or rightmost lane on a road with multiple lanes on each side (e.g., when the host vehicle is traveling in the center lane on a road with three lanes on each side of the road), the recognition-priority setting unit 15' sets the recognition priority for pedestrians to "medium" with respect to both of a rear right side image and a rear left side image captured by the side cameras 21 and 22. This is because, even when the host vehicle is traveling in the center lane, there is a possibility that a pedestrian approaches the left or right side of the host vehicle on foot when the host vehicle is traveling at low speed because of a traffic jam or the like.

Also, when the driving-lane detecting unit 14 detects that the host vehicle is traveling in the rightmost lane on a road with multiple lanes on each side, the recognition-priority setting unit 15' sets the recognition priority for pedestrians to "medium" with respect to both of a rear right side image and a rear left side image captured by the side cameras 21 and 22. This is because, even when the host vehicle is traveling in the rightmost lane, there is a possibility that a pedestrian approaches the left or right side of the host vehicle on foot when the host vehicle is traveling at low speed because of a traffic jam or the like.

In addition, when the driving-lane detecting unit 14 detects that the host vehicle is traveling on a road with one lane on each side, the recognition-priority setting unit 15' sets the recognition priority for pedestrians to "high" with respect to both of a rear right side image and a rear left side image captured by the side cameras 21 and 22. This is because, even when the host vehicle is traveling on a road with one lane on each side, the possibility that a pedestrian approaches the left or right side of the host vehicle on foot is relatively high when the host vehicle is traveling at low speed because of a traffic jam or the like.

As described above in detail, in the second embodiment, a determination is made as to whether or not the host vehicle is driving at low speed, that is, whether or not the traveling speed of the host vehicle is lower than the predetermined speed, and, when the host vehicle is traveling at low speed, the recognition priority for pedestrians is set higher than the recognition priority when the host vehicle is traveling at medium or high speed. According to the second embodiment configured as described above, the recognition priority for pedestrians can be appropriately set in accordance with the traveling speed of the host vehicle and in correspondence with the possibility that a pedestrian approaches the host vehicle.

That is, since the possibility that a pedestrian approaches the host vehicle is considerably low when the host vehicle is traveling at medium or high speed, the recognition priority is set to "low", and since there is a possibility that a pedestrian approaches the host vehicle when the host vehicle is traveling at low speed, the recognition priority is set to "medium" or "high". This can reduce false warnings about pedestrians when the host vehicle is traveling at medium or high speed and can also reduce false-negative warnings about pedestrians when the host vehicle is traveling at low speed.

Although an example in which the recognition priority for pedestrians is set in three steps, that is, "high", "medium", and "low", has been described in the second embodiment, the present invention is not limited thereto. For example, the recognition priority for pedestrians may also be set in two steps, that is, "high" and "low", as in the case of the first embodiment. In such a case, in FIG. 6, the recognition priorities indicating "medium" are set to "high".

An example in which, when the recognition priority is set to "low", the threshold for recognizing, via pattern recognition, that a subject in question is a 3D object to be regarded as a warning target is set to a larger value than the ordinary value has been described above in the first and second embodiments. The present invention, however, is not limited to the example. For example, the number of pattern shapes to be compared with the shape of a subject found in images captured by the side cameras 21 and 22 may also be made smaller than the ordinary number.

In the first and second embodiments, the recognition priority set by the recognition-priority setting unit 15 or 15' may also be displayed on the monitor 31 for presentation to a user. Alternatively, the type of 3D object for which the recognition-priority setting unit 15 or 15' has set the recognition priority to "medium" or "high" may be displayed on the monitor 31 for presentation to the user.

Although an example in which the warning issuing unit 13 is applied to a 3D-object detecting device to configure the vehicle rear left and right side warning apparatus 10 has been described above in the first and second embodiments, the example application of the 3D-object detecting device is not limited to the vehicle rear left and right side warning apparatus 10.

In addition, although the above description in the first and second embodiments is based on traffic that drives on the left, as in Japan, etc., it will suffice to assume that left and right used herein are opposite to each other for traffic that drives on the right, as in the United States of America, etc.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle rear left and right side warning apparatus, comprising:
   a three-dimensional object detecting unit that detects, by using a pattern recognition technology, a three-dimensional object that exists at rear left and right sides of a vehicle, with respect to images captured by cameras that photograph the rear left and right sides of the vehicle;
   a warning issuing unit that issues a warning when a relative positional relationship between the vehicle and the three-dimensional object detected by the three-dimensional object detecting unit satisfies a predetermined condition;
   a driving-lane detecting unit that detects a driving lane of the vehicle; and
   a recognition-priority setting unit that varies and sets a recognition priority for a type of three-dimensional object that the three-dimensional object detecting unit detects by using the pattern recognition technology, based on the driving lane detected by the driving-lane detecting unit and whether a three-dimensional object is detected at the rear left side or at the rear right side of the vehicle;
   wherein the recognition priority includes a first recognition priority and a second, lower recognition priority, and wherein a condition for recognizing that a detected three-dimensional object matches a type of three-dimensional object is tightened for the second recognition priority relative to the first recognition priority to reduce false recognitions.

2. The vehicle rear left and right side warning apparatus according to claim 1, further comprising a traveling-speed detecting unit that detects a traveling speed of the vehicle,
   wherein, based on the driving lane detected by the driving-lane detecting unit and the traveling speed detected by the traveling-speed detecting unit, the recognition-priority setting unit varies and sets the recognition priority for the type of three-dimensional object detected using the pattern recognition technology.

3. The vehicle rear left and right side warning apparatus according to claim 2, wherein, based on the driving lane detected by the driving-lane detecting unit and the traveling speed detected by the traveling-speed detecting unit, the recognition-priority setting unit varies and sets the recognition priority for the type of three-dimensional object, with respect to each of a rear left side image and a rear right side image captured by the cameras.

4. The vehicle rear left and right side warning apparatus according to claim 1, wherein, based on the driving lane detected by the driving-lane detecting unit, the recognition-priority setting unit varies and sets the recognition priority for the type of three-dimensional object, with respect to each of a rear left side image and a rear right side image captured by the cameras.

5. The vehicle rear left and right side warning apparatus according to claim 4, wherein the type of three-dimensional object includes a pedestrian, a four-wheeled vehicle, and a two-wheeled vehicle, and when the driving-lane detecting unit detects that the vehicle is traveling in a leftmost lane on a road with multiple lanes on each side of the road in a jurisdiction that drives on the right, the recognition-priority setting unit sets the recognition priority for the pedestrian lower than the recognition priority for the four-wheeled vehicle and the two-wheeled vehicle, with respect to the rear right side image captured by the camera, and sets the recognition priority for the four-wheeled vehicle and the pedestrian lower than the recognition priority for the two-wheeled vehicle, with respect to the left right side image captured by the cameras.

6. The vehicle rear left and right side warning apparatus according to claim 4, wherein the type of three-dimensional object includes a pedestrian, a four-wheeled vehicle, and a two-wheeled vehicle, and when the driving-lane detecting unit detects that the vehicle is traveling in a lane other than leftmost and rightmost lanes on a road with multiple lanes on each side of the road, the recognition-priority setting unit sets the recognition priority for the pedestrian lower than the recognition priority for the four-wheeled vehicle and the two-wheeled vehicle, with respect to both of the rear left side image and the rear right side image captured by the cameras.

7. The vehicle rear left and right side warning apparatus according to claim 4, wherein the type of three-dimensional object includes a pedestrian, a four-wheeled vehicle, and a two-wheeled vehicle, and when the driving-lane detecting unit detects that the vehicle is traveling in a rightmost lane on a road with multiple lanes on each side of the road in a jurisdiction that drives on the right, the recognition-priority setting unit sets the recognition priority for the four-wheeled vehicle and the pedestrian lower than the recognition priority for the two-wheeled vehicle, with respect to the rear right side image captured by the cameras, and sets the recognition priority for the four-wheeled vehicle and the two-wheeled vehicle higher than the recognition priority for the pedestrian, with respect to the rear left side image captured by the cameras.

8. The vehicle rear left and right side warning apparatus according to claim 4, wherein the type of three-dimensional object includes a pedestrian, a four-wheeled vehicle, and a two-wheeled vehicle, and when the driving-lane detecting unit detects that the vehicle is traveling on a road with one lane on each side of the road, the recognition-priority setting unit sets the recognition priority for the four-wheeled vehicle and the pedestrian lower than the recognition priority for the two-wheeled vehicle, with respect to both of the rear left side image and the rear right side image captured by the cameras.

9. The vehicle rear left and right side warning apparatus according to claim 1, wherein, when the recognition priority is set low, the recognition-priority setting unit sets a threshold for recognizing that a subject in question is a three-dimensional object to be regarded as a warning target to a larger value than an ordinary value, with respect to a degree of match between a shape of a subject found in images captured by the cameras and a pattern shape for a three-dimensional object to be regarded as a warning target.

10. The vehicle rear left and right side warning apparatus according to claim 1, wherein the driving-lane detecting unit comprises:
 a white-line-type recognizing unit that recognizes types of white lines that delimit a driving lane of the vehicle, based on an image including a road surface photographed by the cameras; and
 a driving-lane determining unit that determines the driving lane of the vehicle, based on the types of white lines that exist to the left and right of the vehicle, the types being recognized by the white-line-type recognizing unit.

11. A vehicle rear left and right side warning method, comprising:
 a first step of detecting, by a driving-lane detecting unit in a vehicle rear left and right side warning apparatus, a driving lane of a vehicle;
 a second step of varying and setting, by a recognition-priority setting unit in the vehicle rear left and right side warning apparatus, a recognition priority for a type of three-dimensional object detected using a pattern recognition technology for a captured image, based on the driving lane detected by the driving-lane detecting unit and whether a three-dimensional object is detected at the rear left side or at the rear right side of the vehicle;
 a third step of detecting, by a three-dimensional object detecting unit in the vehicle rear left and right side warning apparatus, a three-dimensional object that exists at the rear left or right sides of a vehicle, with respect to images captured by cameras that photograph the rear left and right sides of the vehicle, by using the pattern recognition technology using the recognition priority varied and set by the recognition-priority setting unit; and
 a fourth step of issuing, by a warning issuing unit in the vehicle rear left and right side warning apparatus, a warning when a relative positional relationship between the vehicle and the three-dimensional object detected by the three-dimensional object detecting unit satisfies a predetermined condition;
 wherein the recognition priority includes a first recognition priority and a second, lower recognition priority, and wherein a condition for recognizing that a detected three-dimensional object matches a type of three-dimensional object is tightened for the second recognition priority relative to the first recognition priority to reduce false recognitions.

12. The vehicle rear left and right side warning method according to claim 11, further comprising:
 a fifth step of detecting, by a traveling-speed detecting unit in the vehicle rear left and right side warning apparatus, a traveling speed of the vehicle,
 wherein in the second step, based on the driving lane detected by the driving-lane detecting unit and the traveling speed detected by the traveling-speed detecting unit, the recognition-priority setting unit varies and sets the recognition priority for the type of three-dimensional object detected using the pattern recognition technology.

13. A three-dimensional object detecting device, comprising:
 a three-dimensional object detecting unit that detects, by using a pattern recognition technology, a three-dimensional object that exists in a predetermined area relative to a vehicle, with respect to an image captured by at least one camera that photographs the predetermined area;

a driving-lane detecting unit that detects a driving lane of the vehicle; and a recognition-priority setting unit that varies and sets a recognition priority for a type of three-dimensional object detected using the pattern recognition technology, based on the driving lane detected by the driving-lane detecting unit and whether a three-dimensional object is detected at the rear left side or at the rear right side of the vehicle;

wherein the recognition priority includes a first recognition priority and a second, lower recognition priority, and wherein a condition for recognizing that a detected three-dimensional object matches a type of three-dimensional object is tightened for the second recognition priority relative to the first recognition priority to reduce false recognitions.

14. The three-dimensional object detecting device according to claim 13, further comprising a traveling-speed detecting unit that detects a traveling speed of the vehicle, wherein, based on the driving lane detected by the driving-lane detecting unit and the traveling speed detected by the traveling-speed detecting unit, the recognition-priority setting unit varies and sets the recognition priority for the type of three-dimensional object using the pattern recognition technology.

15. The three-dimensional object detecting device according to claim 13, wherein, based on the driving lane detected by the driving-lane detecting unit, the recognition-priority setting unit varies and sets the recognition priority for the type of three-dimensional object, with respect to an image of the predetermined area captured by the at least one camera.

16. The three-dimensional object detecting device according to claim 15, wherein the type of three-dimensional object includes a pedestrian, a four-wheeled vehicle, and a two-wheeled vehicle, and when the driving-lane detecting unit detects that the vehicle is traveling in a leftmost lane on a road with multiple lanes on each side of the road in a jurisdiction that drives on the right, the recognition-priority setting unit sets the recognition priority for the pedestrian lower than the recognition priority for the four-wheeled vehicle and the two-wheeled vehicle, with respect to a rear right side image captured by the at least one camera, and sets the recognition priority for the four-wheeled vehicle and the pedestrian lower than the recognition priority for the two-wheeled vehicle, with respect to a rear left side image captured by the at least one camera.

17. The three-dimensional object detecting device according to claim 15, wherein the type of three-dimensional object includes a pedestrian, a four-wheeled vehicle, and a two-wheeled vehicle, and when the driving-lane detecting unit detects that the vehicle is traveling in a lane other than leftmost and rightmost lanes on a road with multiple lanes on each side of the road, the recognition-priority setting unit sets the recognition priority for the pedestrian lower than the recognition priority for the four-wheeled vehicle and the two-wheeled vehicle, with respect to both of a rear left side image and a rear right side image captured by the at least one camera.

18. The three-dimensional object detecting device according to claim 15, wherein the type of three-dimensional object includes a pedestrian, a four-wheeled vehicle, and a two-wheeled vehicle, and when the driving-lane detecting unit detects that the vehicle is traveling in a rightmost lane on a road with multiple lanes on each side of the road in a jurisdiction that drives on the right, the recognition-priority setting unit sets the recognition priority for the four-wheeled vehicle and the pedestrian lower than the recognition priority for the two-wheeled vehicle, with respect to a rear right side image captured by the at least one camera, and sets the recognition priority for the four-wheeled vehicle and the two-wheeled vehicle higher than the recognition priority for the pedestrian, with respect to a rear left side image captured by the at least one camera.

19. The three-dimensional object detecting device according to claim 15, wherein the type of three-dimensional object includes a pedestrian, a four-wheeled vehicle, and a two-wheeled vehicle, and when the driving-lane detecting unit detects that the vehicle is traveling on a road with one lane on each side of the road, the recognition-priority setting unit sets the recognition priority for the four-wheeled vehicle and the pedestrian lower than the recognition priority for the two-wheeled vehicle, with respect to both of a rear left side image and a rear right side image captured by the at least one camera.

20. The three-dimensional object detecting device according to claim 13, wherein, when the recognition priority is set low, the recognition-priority setting unit sets a threshold for recognizing that a subject in question is a three-dimensional object to be regarded as a warning target to a larger value than an ordinary value, with respect to a degree of match between a shape of a subject found in images captured by the at least one camera and a pattern shape for a three-dimensional object to be regarded as a warning target.

21. The three-dimensional object detecting device according to claim 13, wherein the driving-lane detecting unit comprises:

a white-line-type recognizing unit that recognizes types of white lines that delimit a driving lane of the vehicle, based on an image including a road surface photographed by the at least one camera; and a driving-lane determining unit that determines the driving lane of the vehicle, based on the types of white lines that exist to the left and right of the vehicle, the types being recognized by the white-line-type recognizing unit.

* * * * *